Sept. 25, 1928.
A. G. STEVENSON
1,685,507
KAFIR CORN HEADER
Filed March 25, 1926
2 Sheets-Sheet 1
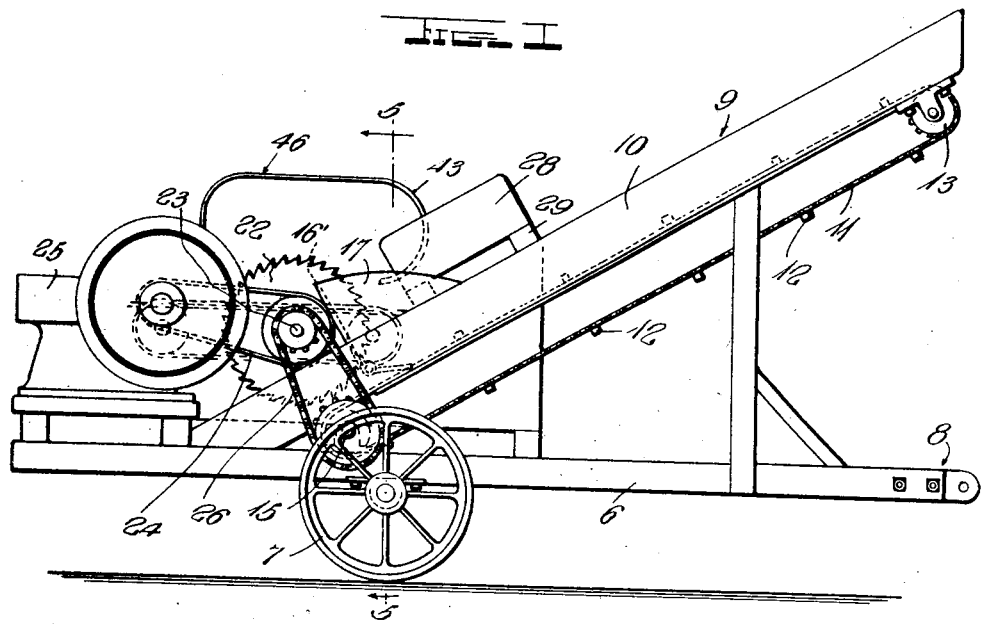
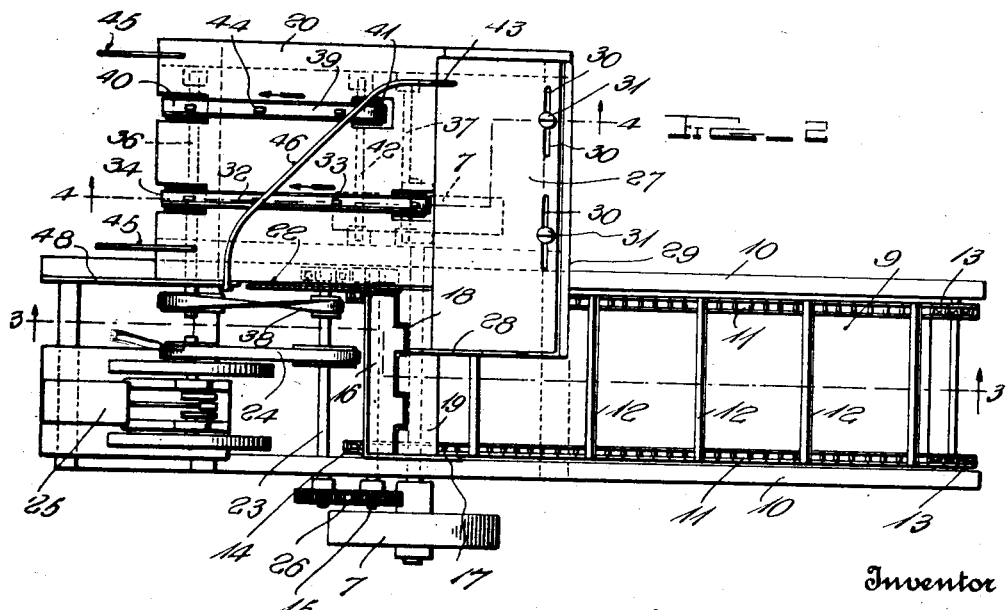
Inventor
Arthur G. Stevenson,
Witness Sept. 25, 1928.
A. G. STEVENSON
1,685,507
KAFIR CORN HEADER
Filed March 25, 1926
2 Sheets-Sheet 2
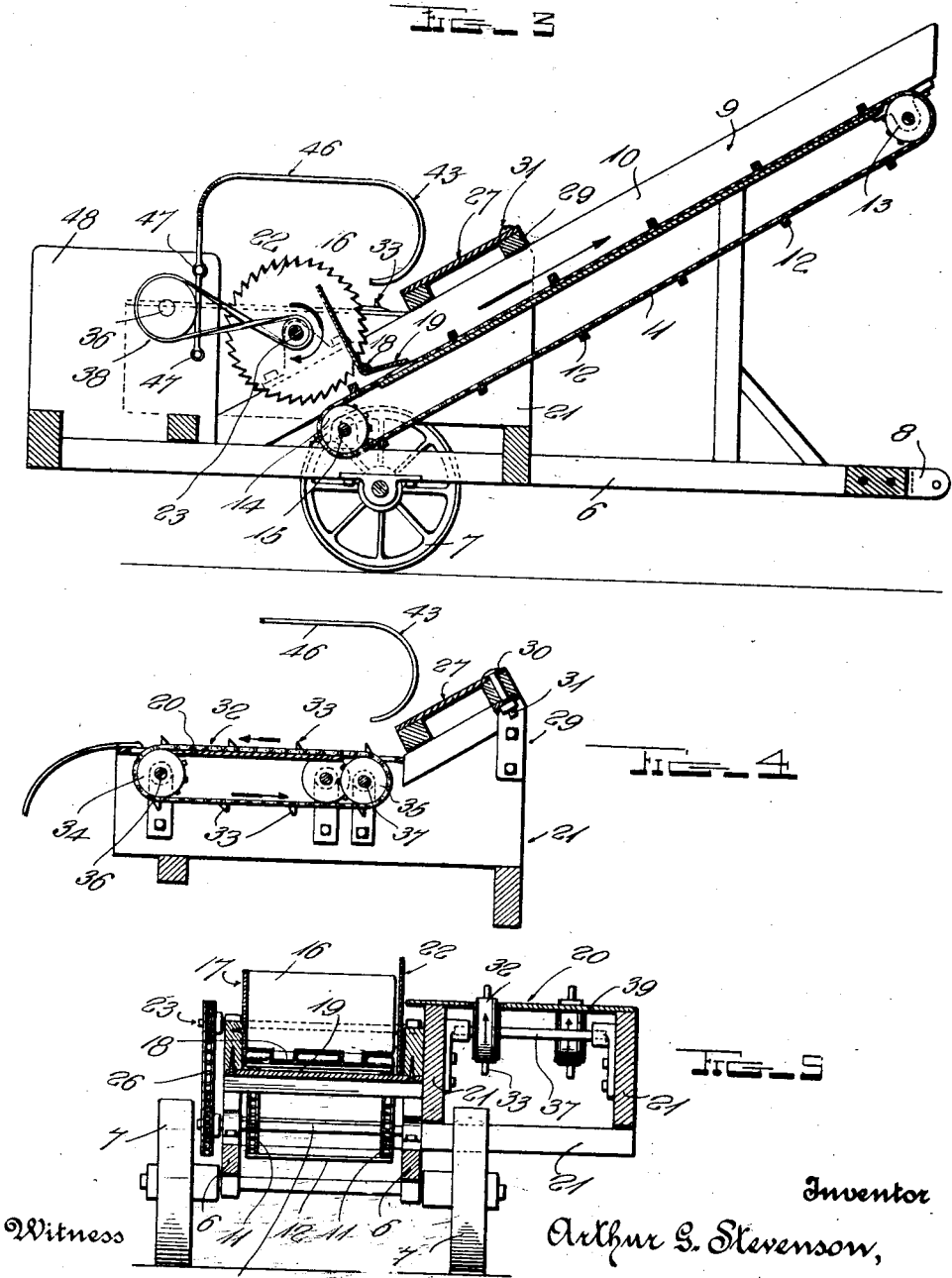

Patented Sept. 25, 1928.

1,685,507

UNITED STATES PATENT OFFICE.

ARTHUR G. STEVENSON, OF OTTAWA, KANSAS.

KAFIR-CORN HEADER.

Application filed March 25, 1926. Serial No. 97,333.

The invention relates to improvements in machines for rapidly cutting the heads from kafir corn and the like, and the present disclosure is directed more particularly to a portable machine which may be connected to the rear end of a wagon and may be driven from one shock of grain to another, heading the bundles, discharging the heads into the wagon bed, and stacking the butts or stalks.

One of the most important objects of the invention is to provide a machine of the class set forth which, while being of extreme simplicity, will be highly efficient, easy to operate, and in every way desirable.

Another object of the invention is to provide a machine in which unique provision is made for properly presenting the bundles of corn or the like to a driven cutter which severs the heads therefrom, novel provision being made whereby stalk feeding means on a stalk supporting table, cannot swing the stalks around into acute angular relation with the rotatable cutter, when the heads are obstructed in their movement, by engagement with said cutter.

With the foregoing and minor objects in view, the invention resides in the novel subject matter hereinafter described and claimed, the description being supplemented by the accompanying drawings.

Figure 1 is a side elevation.

Figure 2 is a top plan view.

Figures 3 and 4 are longitudinal sectional views as indicated by lines 3—3 and 4—4 of Figure 2.

Figure 5 is a vertical transverse section as indicated by line 5—5 of Figure 1.

In the drawings above briefly described, the numeral 6 designates a horizontally elongated base frame which is mounted between its ends upon appropriate supporting wheels 7, said frame having a hitch 8 at one end, facilitating connection of said end with a wagon, so that the machine may trail behind the wagon when it is moved from one shock to another, and is thus in proper position when each shock is reached, to discharge the severed heads into the wagon body. An inclined elevator 9 is mounted upon the base frame 6 and inclines from the latter to a point above the hitch 8, for elevating the severed heads to the body of the wagon, said conveyor preferably comprising a trough 10 having a solid bottom, sprocket chains 11 having slats 12 movable upwardly along said bottom, and upper and lower sets of sprocket wheels 13 and 14 for said chains, the upper wheels 13 being mounted in any desired manner while the lower wheels 14 are secured to a transverse shaft 15 which is driven by means yet to be described.

Extending transversely across the lower portion of the trough 10, is a barrier wall 16, one of whose ends is turned laterally at 17 and secured to one side of said trough, while the other end of said barrier wall terminates in slightly spaced relation with the opposite side of said trough. Hinged at 18 to the lower edge of the wall 16, is a plate 19 which prevents any heads from descending under said wall 16, the pivotal mounting of this plate permitting it to rise when encountered by the slats 12, and again allowing descent of the plate when the slats have passed.

At the side of the frame 6, remote from the wall end 17, is a horizontal table 20 which is rigidly supported by any desired frame structure 21, said table being in a plane above the portion of the trough 10 in which the barrier wall 16 is mounted. At the inner edge of this table, a rotatable cutter 22 is mounted, a portion of this cutter being positioned between the inner end of the barrier wall 16 and the inner side of the trough 10, so that a portion of the cutter is exposed above the table 20 and at the side of the barrier wall 16, toward the upper end of the elevator 9, this portion of the cutter being adapted to sever heads from the corn or the like as the latter is being fed along the table 20. The cutter 22 is carried by a shaft 23 suitably mounted upon the frame of the machine, in the present instance upon the lower end of the trough 10. This shaft 23 is driven by a belt 24 and suitable pulleys from a small gas engine 25 mounted upon the base frame 6, and by a sprocket chain 26 and suitable sprockets, said shaft 23 is connected with the shaft 15, for the purpose of driving the elevator chains 11.

A corn guiding plate 27 which extends transversely of the machine, declines to the inner or receiving end of the table 20 and at one end overhangs a portion of the elevator 9, this end of the plate 27, being provided with an upstanding guide wall 28. The plate 27 is mounted upon a suitable auxiliary frame structure 29 carried by the frame structure 21, and it may well be adjustably connected with said auxiliary frame structure, so that it may be adjusted to overhang the elevator 9 to a greater or lesser degree. In the present showing, the plate is formed with slots 30 and the bolt 31 passes through these slots, permitting the necessary adjustment and after such adjustment serving to tightly clamp the plate 27 in position.

Extending along the intermediate portion of the table 20 is a stalk engaging feed chain 32 having stalk engaging teeth 33, this chain being trained around sprockets 34 and 35 on shafts 36 and 37 which extend transversely of the frame structure 21, beneath the table 20. The shaft 36 is driven by a crossed belt 38 and suitable pulleys, from the shaft 23, so that the chain 32 will travel in the reverse direction from the chains 11 of the elevator 9.

Near the outer edge of the table 20, I provide another chain 39 which is trained around a sprocket 40 on the shaft 36 and around another sprocket 41 on a shaft 42, the latter shaft being carried by the frame structure 21 and being spaced from the plate 27 a greater distance than the shaft 37. The chain 39 is thus much shorter than the chain 32, and whereas the latter has one end of its upper reach disposed substantially at the lower edge of the plate 27, the corresponding end of the upper reach of chain 39, is placed quite a distance from said lower edge of said plate. Thus, as a bundle of corn or the like slides down the plate 27 by gravity, it is engaged first by the chain 32, which presents its heads to the cutter 22. The travel of the bundle being thus resisted at one end by this cutter, there is a tendency for the other end to swing around upon the table until the bundle is at an acute angle with respect to the cutter 22. To prevent any such occurrence as this however, I provide a resilient retarder 43 to engage and hold the butt ends of the stalks till the heads have been servered from them. By the time the heads have been cut off however, the resistance of the retarder 43 has been overcome and the bundle has progressed sufficiently far to be engaged by the teeth 44 of the chain 39, so that the two chains 39 and 32 then carry the bundle of butts along the table 20 and drop from it from the end of said table, the latter being provided with suitable bundle guiding arms 45.

The retarder 43 is preferably formed by downwardly curving one end of a resilient arm 46 which extends obliquely of and overlies the table 20, the other end of said arm being suitably anchored. In the present showing, this arm is secured at 47 to a fender plate 48 rising from the base frame 6, in about the same plane with the cutter 22, that is at the inner edge of the table 20.

By employing the novel construction shown and described or a substantial equivalent thereof, a machine is provided which is of light weight and hence may readily be drawn behind an ordinary wagon or truck, and by stopping both the leading vehicle and the trailer machine first at one shock of corn or the like and then at another, the bundles may be quickly and easily headed, the heads discharged into the bed of the wagon or truck, and the bundles of butts or stalks, dropped upon the ground. When one wagon is fully loaded, it may be disconnected from the machine and driven to the point at which the load is to be discharged, and if desired, in order to save time, another wagon may at that time be connected with the machine, so that the operation of the latter may proceed.

While excellent results are obtainable from the general construction disclosed, it is to be understood that within the scope of the invention as claimed, numerous variations may be made.

I claim:

1. A stalk header comprising a table, a driven cutter at one edge of said table for severing the heads from stalks fed along said table, a relatively short feed belt extending along the table near its other edge, a comparatively long feed belt extending along the intermediate portion of said table with its inner end projecting beyond the inner end of the first named belt, a stalk guiding plate declining to the inner end of said relatively long belt and spaced from the inner end of the shorter belt, the lower edge of said plate being disposed adjacent said cutter, and a resiliently mounted retarder adapted to engage the butt ends of the stalks to hold the latter against angling upon the table as they are presented to the cutter, said retarder being mounted slightly above and adjacent to the lower end of said plate and the contiguous portion of the table.

2. A heading machine comprising an inclined elevator, a horizontal stalk supporting table extending laterally from the lower portion of said elevator, a driven heading cutter at the inner edge of said table, stalk feeding means operatively associated with said table, means for driving said feeding means in a reverse direction from the travel of the elevator, a stalk guiding plate declining toward said cutter at the receiving end of said table, the inner end of said plate overlying the lower portion of said elevator and means whereby said stalk guiding plate may be adjusted transversely of the elevator to overhang a greater or lesser portion of the latter.

In testimony whereof I have hereunto affixed my signature.

ARTHUR G. STEVENSON.